(12) United States Patent
Bennett

(10) Patent No.: US 9,027,294 B2
(45) Date of Patent: May 12, 2015

(54) WINDOW ASSEMBLY HAVING A PRIMER

(75) Inventor: Dan Bennett, Tecumseh, MI (US)

(73) Assignee: AGC Automotive Americas R&D, Inc., Ypsilanti, MI (US)

(*) Notice: Subject to any disclaimer, the term of this patent is extended or adjusted under 35 U.S.C. 154(b) by 0 days.

(21) Appl. No.: 13/812,370

(22) PCT Filed: Jul. 27, 2011

(86) PCT No.: PCT/US2011/045556
§ 371 (c)(1),
(2), (4) Date: Feb. 22, 2013

(87) PCT Pub. No.: WO2012/015936
PCT Pub. Date: Feb. 2, 2012

(65) Prior Publication Data
US 2013/0140844 A1  Jun. 6, 2013

Related U.S. Application Data

(60) Provisional application No. 61/400,368, filed on Jul. 27, 2010, provisional application No. 61/464,663, filed on Mar. 7, 2011.

(51) Int. Cl.
*B60J 1/10* (2006.01)
*B60J 1/00* (2006.01)
*B60J 10/02* (2006.01)

(52) U.S. Cl.
CPC *B60J 1/00* (2013.01); *Y10T 156/10* (2015.01); *B60J 10/02* (2013.01)

(58) Field of Classification Search
CPC ............................................. B60J 1/00
USPC .......................... 156/60; 296/96.11
See application file for complete search history.

(56) References Cited

U.S. PATENT DOCUMENTS

| 4,139,234 | A | * | 2/1979 | Morgan ........................ 296/201 |
| 4,539,363 | A | | 9/1985 | Backhouse |
| 4,769,310 | A | | 9/1988 | Gugger et al. |
| 5,302,557 | A | | 4/1994 | Carroll et al. |
| 5,328,753 | A | * | 7/1994 | Boaz ............................ 428/210 |

(Continued)

FOREIGN PATENT DOCUMENTS

| CN | 101096293 A | 1/2008 |
| JP | H 08-040067 A | 2/1996 |

(Continued)

OTHER PUBLICATIONS

English language abstract and translation for JP 2005-120215 extracted from PAJ database on May 14, 2013, 34 pages.

(Continued)

*Primary Examiner* — Charles A Fox
*Assistant Examiner* — Patrick Maestri
(74) *Attorney, Agent, or Firm* — Howard & Howard Attorneys PLLC

(57) ABSTRACT

A window assembly is used in a vehicle. The window assembly comprises a transparent pane having an inner surface and an outer surface spaced from the inner surface. The window assembly also comprises a ceramic frit disposed on a portion of the transparent pane. A primer is disposed on at least one of the transparent pane and the ceramic frit for providing a bonding surface. An encapsulation is coupled to the primer.

28 Claims, 2 Drawing Sheets

(56) References Cited

U.S. PATENT DOCUMENTS

| | | | |
|---|---|---|---|
| 5,443,673 A * | 8/1995 | Fisher et al. | 156/245 |
| 5,616,417 A | 4/1997 | Ryan | |
| 5,783,507 A | 7/1998 | Sakoske | |
| 5,925,160 A | 7/1999 | Sakoske | |
| 5,938,834 A | 8/1999 | Boaz | |
| 5,968,659 A | 10/1999 | Sakoske et al. | |
| 6,126,737 A | 10/2000 | Mason | |
| 6,176,919 B1 | 1/2001 | Mason | |
| 6,193,835 B1 | 2/2001 | Yoshikawa et al. | |
| 6,238,847 B1 | 5/2001 | Axtell, III et al. | |
| 6,248,805 B1 | 6/2001 | Nguyen et al. | |
| 6,293,609 B1 * | 9/2001 | Xu et al. | 296/146.15 |
| 6,485,838 B1 * | 11/2002 | Shimada et al. | 428/429 |
| 6,521,052 B2 | 2/2003 | Park et al. | |
| 6,803,175 B2 | 10/2004 | Kobayashi | |
| 6,936,556 B2 | 8/2005 | Sridharan et al. | |
| 7,056,380 B2 | 6/2006 | Beyrle | |
| 7,713,955 B2 | 5/2010 | Whiteford et al. | |
| 7,744,984 B2 | 6/2010 | Haack et al. | |
| 2005/0126441 A1 | 6/2005 | Skelhorn | |
| 2005/0158519 A1 | 7/2005 | Summerer | |
| 2006/0225776 A1 * | 10/2006 | Nemazi et al. | 136/244 |
| 2006/0249245 A1 * | 11/2006 | Balling et al. | 156/241 |
| 2007/0154561 A1 | 7/2007 | Takeda et al. | |
| 2008/0268261 A1 * | 10/2008 | Schwoeppe et al. | 428/432 |
| 2009/0076189 A1 | 3/2009 | Matsushige et al. | |
| 2009/0079231 A1 | 3/2009 | Allen et al. | |
| 2009/0123640 A1 | 5/2009 | Suzuki | |
| 2009/0293368 A1 | 12/2009 | Repp et al. | |
| 2010/0216907 A1 | 8/2010 | Matsushige et al. | |
| 2011/0143015 A1 | 6/2011 | Morosawa et al. | |

FOREIGN PATENT DOCUMENTS

| | | |
|---|---|---|
| JP | 2005-120215 A | 5/2005 |
| JP | 2005-179459 A | 7/2005 |
| JP | 2008-260881 A | 10/2008 |
| WO | WO 2010/016373 A1 | 2/2010 |

OTHER PUBLICATIONS

English language abstract and translation for JP 2005-179459 extracted from PAJ database on May 14, 2013, 22 pages.

English language abstract and translation for JP 2008-260881 extracted from PAJ database on May 14, 2013, 27 pages.

English language abstract for WO 10/016373 extracted from Espacenet.com database on May 14, 2013, 1 page.

International Search Report for Application No. PCT/US2011/045556 dated Jan. 5, 2012, 2 pages.

English language abstract for CN 101096293 extracted from espacenet.com database on Mar. 4, 2015, 1 page.

English language abstract and machine-assisted English translation for JPH 08-040067 extracted from the PAJ database on Mar. 4, 2015, 16 pages.

* cited by examiner

WINDOW ASSEMBLY HAVING A PRIMER

CROSS REFERENCE TO RELATED APPLICATION

This application is the National Stage of International Patent Application No. PCT/US2011/045556, filed on Jul. 27, 2011, which claims priority to and all advantages of U.S. Provisional Patent Application No. 61/400,368, filed on Jul. 27, 2010 and U.S. Provisional Patent Application No. 61/464,663, filed on Mar. 7, 2011, the content of which is incorporated herein by reference.

BACKGROUND OF THE INVENTION

1. Field of the Invention

The present invention generally relates to a window assembly. More specifically, the present invention relates to a window assembly including a primer and an encapsulation.

2. Description of the Related Art

Primers for bonding an encapsulation are generally known in the art. Generally, window assemblies include a transparent pane, commonly made from glass. A ceramic frit is disposed about a perimeter of the transparent pane by methods commonly known in the art, like printing the ceramic frit on the transparent pane. The encapsulation is bonded to the perimeter of the transparent pane. The encapsulation can be bonded to one, two, or three surfaces of the transparent pane. Generally, the encapsulation can be either a thermoset material, such as a reaction injection molded (RIM) material, or a thermoplastic material, such as polyvinylchloride (PVC) or a thermoplastic elastomer (TPE) material.

The encapsulation is bonded to the transparent pane via the primer. Said differently, the encapsulation bonds to the primer, which is bonded to the transparent pane, thereby bonding the encapsulation to the transparent pane. The primer increases a bond strength between the encapsulation and the transparent pane as compared to a bond strength between the encapsulation and the transparent pane without the primer. Said differently, the encapsulation bonds better to the primer than it does with the transparent pane directly. The primer also serves to conceal an exposed edge of the transparent pane, which provides a more aesthetically pleasing appearance.

The ceramic frit has a color, which is typically referred to as black, for absorbing solar energy and impeding the solar energy from penetrating the window assembly. Preventing the solar energy from penetrating the window assembly prevents degradation of chemical and physical properties of the primer, thereby preserving the bond strength between the encapsulation and the transparent pane. When the encapsulation is bonded to three surfaces of the transparent pane, known in the art as a three-sided encapsulation, the ceramic frit and the primer are substantially covered and the color of the primer is not important. However, when the encapsulation is only bonded to one or two surfaces of the transparent pane, known in the art as one-sided or two-sided encapsulations, respectively, the primer is visible from the exterior of the vehicle. In such a case, it is desirable for a color of the primer to blend with the color of the ceramic frit so that an observer is not able to differentiate between the ceramic frit and the primer thereby providing an aesthetically pleasing appearance of the window assembly.

The primer is selected from known conventional primers based on the material used to make the encapsulation. For example, the conventional primers used with the thermoset material chemically react with the thermoset material of the encapsulation to chemically bond the encapsulation to the primer. More specifically, the conventional primers used for the thermoset material of the encapsulation are polyurethane primers, which are isocyanate-based, and react with the thermoset material to form covalent bonds. The conventional primers used for the thermoset material are short chain polymers due to the chemical bond that is to be formed. Alternatively, the conventional primers used with the thermoplastic material provide an adhesive bond and do not chemically react with the thermoplastic material of the encapsulation. More specifically, the conventional primers used with the thermoplastic material are typically long chain polymers that only mix with the thermoplastic material, which results in polymer chain entanglement. Generally, the conventional primers used with the thermoset material cannot be used with thermoplastic material because the conventional primers used with the thermoset material are short chain polymers, which are inadequate for mixing with the thermoplastic material.

The conventional primers used when the encapsulation is the thermoset material have a color that is referred to as black and generally blend with the color of the ceramic frit, which is desirable. However, using the thermoset material for the encapsulation is more costly than using the thermoplastic material. The thermoplastic material rather than the thermoset material for the encapsulation may be used to reduce manufacturing costs of the window assemblies.

The conventional primers available for use when the encapsulation is the thermoplastic material are typically transparent or differently colored from the black color of the ceramic frit. For example, when the encapsulation is PVC, the primer is typically a transparent light green color. As described above, the conventional primers used with the thermoset material cannot be used with the thermoplastic material. Therefore, when the encapsulation is the thermoplastic material, the window assembly cannot benefit from the black color of the conventional primers used when the encapsulation is the thermoset material and must use either the transparent conventional primers or the differently colored conventional primers.

The transparent conventional primers use with the thermoplastic material are not desirable because the exposed edge of the transparent pane remains visible or is even accentuated, which results in a poor aesthetic appearance. Additionally, the differently colored conventional primers used with the thermoplastic material do not blend with the black color of the ceramic frit, which results in a poor aesthetic appearance. Therefore, cost savings associated with manufacturing the window assemblies using the thermoplastic material rather than the thermoset material cannot be realized without sacrificing the aesthetic appearance of the window assemblies.

SUMMARY OF THE INVENTION AND ADVANTAGES

A window assembly for use with a vehicle comprises a transparent pane having an inner surface and an outer surface opposite the inner surface. A ceramic frit is disposed on a portion of the transparent pane. A primer is disposed on at least one of the transparent pane and the ceramic frit for providing a bonding surface. An encapsulation is bonded to the bonding surface of the primer for coupling the transparent pane to the vehicle.

The ceramic frit has a frit color and the primer has a primer color. In one aspect of the invention, a Delta-E value between the frit color of the ceramic frit and the primer color of the primer is less than about 5. As such, the primer blends into the ceramic frit to provide an aesthetically pleasing appearance to the window assembly.

In another aspect of the invention, the primer includes an element tracer. The element tracer comprises at least one metal oxide that is different than the metal oxide present in the ceramic frit. The element tracer allows a presence of the primer on the transparent pane to be verified to ensure the primer was properly applied to the transparent pane.

In yet another aspect of the invention, methods of manufacturing the window assembly are disclosed.

BRIEF DESCRIPTION OF THE DRAWINGS

Other advantages of the present invention will be readily appreciated, as the same becomes better understood by reference to the following detailed description, when considered in connection with the accompanying drawings wherein.

DETAILED DESCRIPTION OF THE INVENTION

Figure 1:
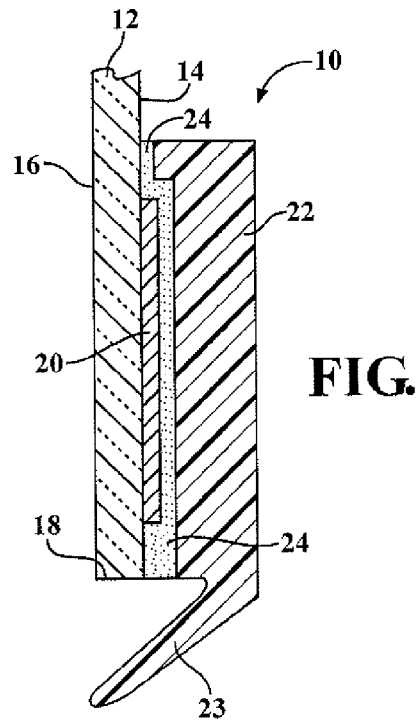
FIG. 1 is a cross-sectional view of a transparent pane of a window assembly showing a primer bonding a single sided encapsulation to the transparent pane.

Referring to the Figures, wherein like numerals indicate like or corresponding parts throughout the several views, a window assembly is generally shown at 10. The window assembly 10 is suitable for use in a vehicle, for example vent windows and quarter windows, as well as vertical and horizontal sliding windows. Additionally, it is to be appreciated that the window assembly 10 may also be implemented in non-vehicle applications.

With reference to FIGS. 1-5, the window assembly 10 includes a transparent pane 12, also commonly referred to as a glazing, having an inner surface 14 and an outer surface 16 spaced from and opposite to the outer surface 14. It is to be appreciated that the transparent pane 12, as described herein, may be partially or completely transparent and may even be tinted to various levels such that the transparent pane 12 may be opaque. The transparent pane 12 is not required to be completely transparent. The transparent pane 12 further includes an edge 18, with the edge 18 defining a perimeter of the transparent pane 12. The edge 18 is between and connects the inner surface 14 and the outer surface 16.

The transparent pane 12 is typically glass, more typically soda-lime glass. However, it is to be appreciated that the transparent pane 12 may be any other type of glass, including non-tempered glass or tempered glass, non-laminated glass or laminated glass, or any polymeric material known in the art.

Figure 2:
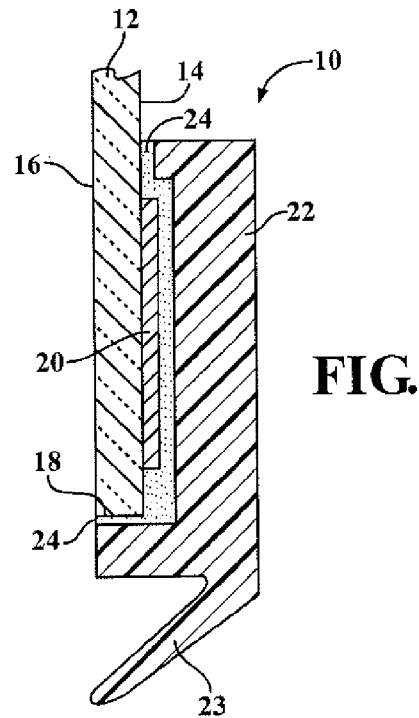
FIG. 2 is a cross-sectional view of the transparent pane of the window assembly showing the primer bonding a double sided encapsulation to the transparent pane.
Figure 3:
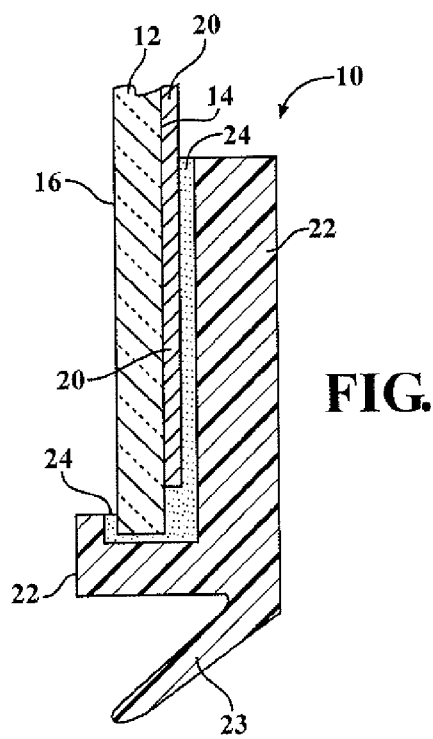
FIG. 3 is a cross-sectional view of the transparent pane of the window assembly showing the primer bonding a triple sided encapsulation to the transparent pane.

An encapsulation 22 is bonded to the transparent pane 12. Typically, the encapsulation 22 is bonded to the perimeter of the transparent pane 12 on the inner surface 14. Generally, the encapsulation 22 allows the window assembly 10 to be coupled to the vehicle. The encapsulation 22 has a seal 23 for sealing between the window assembly 10 and the vehicle. The seal 23 of the encapsulation 22 allows for a seamless transition from the edge 18 of the transparent pane 12 to sheet metal of the vehicle. Furthermore, locator clips/pins may be attached to the transparent pane 12 via over molding of the encapsulation 22 for assisting with proper placement of the transparent pane 12 on the vehicle. The encapsulation 22 also protects the edge 18 of the transparent pane 12 from breaking. The coupling of the encapsulation 22 to the transparent pane 12 results in a bond strength between the encapsulation 22 and the transparent pane 12. As shown in FIG. 1, the encapsulation 22 may be a single-sided encapsulation. However, it is to be appreciated that the encapsulation 22 may alternatively be a double-sided encapsulation, as shown in FIG. 2, or a triple-sided encapsulation, as shown in FIG. 3. When the encapsulation 22 is bonded to a single surface, such as the inner surface 14 or the outer surface 16 of the transparent pane 12, it is generally referred to in the art as the single sided encapsulation. When the encapsulation 22 is bonded to the edge 18 and either of the inner surface 14 or the outer surface 16 of the transparent pane 12, it is generally referred to in the art the double-sided encapsulation. When the encapsulation 22 is bonded to the inner surface 14, the outer surface 16 and the edge 18 of the transparent pane 12, it is generally referred to in the art as the triple-sided encapsulation.

The encapsulation 22 is typically a polymeric material, and more typically a thermoplastic material, such as a polyvinylchloride (PVC) or a thermoplastic elastomer (TPE) material. It is to be appreciated that the encapsulation 22 can also be various other polymeric materials including, but not limited to, a thermoplastic vulcanizate (TPV) material; a thermoplastic polyolefin (TPO) material; a thermoplastic styrene (TPS) material; and/or any other suitable materials for encapsulation. The encapsulation 22 may also be a thermoset material, such as a reaction injection molded (RIM) material. The RIM material may be polyurethane. However, the encapsulation may be other thermoset materials.

A ceramic frit 20 may be disposed on the transparent pane 12. Typically, the ceramic frit 20 is disposed on the inner surface 14 of the transparent pane 12. The ceramic frit 20 is bonded to the transparent pane 12 by known methods, such as printing and in such methods the transparent pane 12 may be referred to as a printed assembly. The ceramic frit 20 may present a uniform border around the perimeter of the transparent pane 12, thereby enhancing an aesthetic appearance of the window assembly 10. It is to be appreciated that the ceramic frit 20 may be omitted from the transparent pane 12. If the ceramic frit 20 is omitted, the transparent pane 12 is known in the art as a non-printed assembly. The ceramic frit 20 may be spaced from the edge 18 of the transparent pane 12, such that a portion of the inner surface 14 of the transparent pane 12 is exposed between the ceramic frit 20 and the edge 18 of the transparent pane 12. Additionally, the primer 24 may be disposed on the ceramic frit 20 such that the ceramic frit 20 is between the primer 24 and the transparent pane 12.

Generally, the ceramic frit 20 is opaque to absorb solar energy and impede the solar energy from penetrating the window assembly 10 and negatively affecting chemical and physical properties of the primer 24, which can negatively affect the bond strength between the encapsulation 22 and the transparent pane 12. Additionally, the primer 24 may include UV additives to impede solar energy from penetrating the window assembly 10 and negatively affecting chemical and physical properties of the encapsulation 22 and/or the primer 24 itself.

Typically, the primer 24 is coupled to at least one of the transparent pane 12 and the ceramic frit 20 for providing a bonding surface on the transparent pane 12. Generally, the encapsulation 22 is bonded to the bonding surface provided by the primer 24 for bonding the encapsulation 22 to the transparent pane 12. Said differently, the encapsulation 22 bonds to the primer 24, which is bonded to the transparent pane 12, thereby bonding the encapsulation 22 to the transparent pane 12. The bonding of the encapsulation 22 to the transparent pane 12 via the primer is also known as adhesive bonding. Said differently, the primer 24 does not chemically react with the material of the encapsulation 22. The primer 24 increases the bond strength between the encapsulation 22 and the transparent pane 12 as compared to possible bond strengths directly between the encapsulation 22 and the transparent pane 12 without the primer 24. Said differently, the encapsulation 22 bonds better to the primer 24 than it would bond with the transparent pane 12 directly.

Figure 4:
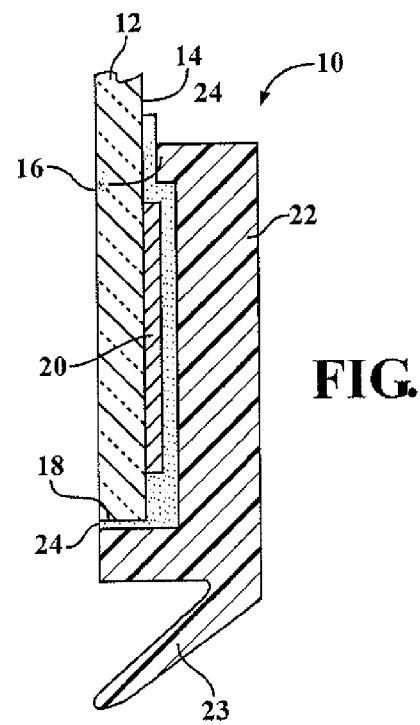
FIG. 4 is a cross-sectional view of the transparent pane of the window assembly showing the primer extending beyond the single sided encapsulation.
Figure 5:
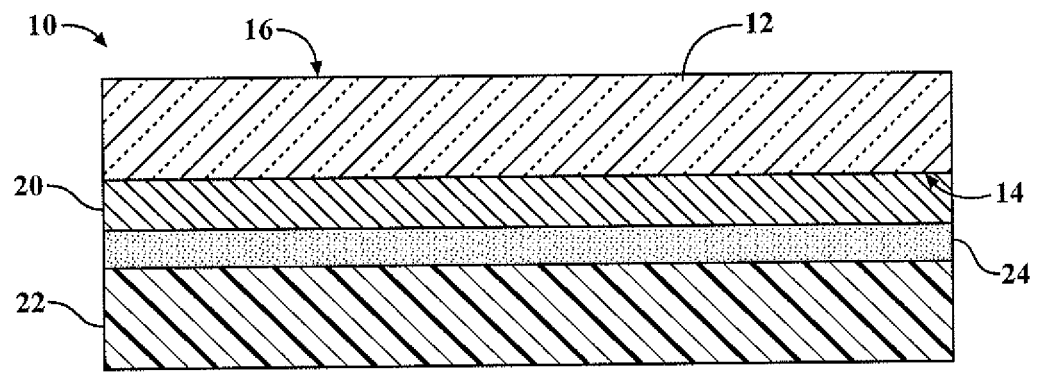
FIG. 5 is another cross-sectional view of the transparent pane of the window assembly.

Although the encapsulation 22 is bonded to the primer 24, the primer may still be visible when the window assembly 10 is viewed. For example, the primer 24 may extend beyond the encapsulation 22 as shown in FIG. 4. Additionally, because the primer 24 is sandwiched between the transparent pane 12 and the encapsulation 22, the primer may be visible when the window assembly 10 is viewed at an angle. Furthermore, the primer 24 and the ceramic frit 20 may be visible through the transparent pane when the ceramic frit 20 and primer 24 are only disposed on side of the transparent pane 12.

A composition of the primer 24 is dependent on the material of the encapsulation 22. For example, when the encapsulation 22 is PVC, the primer 24 typically comprises a polyester. Typically, the polyester is a reaction product of a polyester polyol and an isocyanate. When the encapsulation 22 is the TPE material, the primer 24 typically comprises polypropylene. More specifically, when the encapsulation is the TPE material, the primer 24 comprises a modified polypropylene, such as polypropylene with polar functional groups. For example, the modified polypropylene may be a halogenated polypropylene. However, it is to be appreciated that any modified polypropylene may be used. When the encapsulation 22 is the thermoset material, the primer 24 typically comprises polyurethane resulting from the reaction of a hydroxy-functional polyol and an isocyanate.

Generally, each of the ceramic frit 20 and the primer 24 comprise at least one metal oxide. Suitable metal oxides for the ceramic frit 20 include, but are not limited to, chromium oxide, manganese oxide, copper oxide, iron oxide, and combinations thereof. Suitable metal oxides for the primer 24 include, but are not limited to, iron oxide, cobalt oxide, manganese oxide, zinc oxide, and combinations thereof. Typically, the primer 24 comprises the cobalt oxide. Even more typically, the primer 24 comprises the cobalt oxide and the zinc oxide. At least one of the metal oxides of the primer 24 is different than the metal oxides of the ceramic frit 20. Having at least one of the metal oxides of the primer 24 different than the metal oxides of the ceramic frit 20 allows the metal oxide of the primer 24 that is different to function as an elemental tracer for verifying the presence of the primer 24 during subsequent operations. Typically, the cobalt oxide is used as the elemental tracer in the primer 24.

The primer 24 and the ceramic frit 20 each have a color. Said differently, each of the primer 24 and the ceramic frit 20 include pigment components for imparting the primer 24 with a primer color and the ceramic frit 20 with a frit color. The primer color of the primer 24 and the frit color of the ceramic frit 20 can be defined by an "L" value, an "a" value, and a "b" value, i.e., the primer 24 and the ceramic frit 20 each have L*a*b* values. L*a*b* values of the primer 24 and the ceramic frit 20 can be measured by a spectrophotometer according to a Hunter Lab color scale. The Hunter Lab color scale is a color-measuring system that is well known to those skilled in the color art. The spectrophotometer employed for measuring the L*a*b* values is typically a Konica Minolta spectrophotometer, although other types of spectrophotometers can also be used. In the Hunter Lab color scale, the L value is associated with a central vertical axis that represents lightness and darkness, the lightest being L=100 (white) and the darkest being L=0 (black). Further, in the Hunter Lab color scale, the a value is associated with a red/green scale and the b scale is associated with a yellow/blue scale. It is to be appreciated that unlike the L value, the a and b values have no numerical limits. A positive a value is red and a negative a value is green. A positive b value is yellow and a negative b value is blue. It is to be appreciated that other color scales can be used to determine the primer color and the ceramic frit 20, such as CIELAB color space.

Generally, the primer color is substantially similar to the frit color. Said differently, the primer color blends with the frit color such that when both the primer color and the frit color are viewed simultaneously, a border between the primer 24 and the ceramic frit 20 is not noticeable. Because there is not a noticeable border between the primer 24 and the ceramic frit 20, it is not noticeable that the primer 24 extends beyond the encapsulation 22.

The metal oxides present in the primer 24 and the ceramic frit 20 can be the pigment component thereby influencing the primer color and the frit color. For example, each of the cobalt oxide, the manganese oxide, iron oxide, and the zinc oxide used in the primer 24 impart a different color to the primer 24. With respect to the primer 24, the metal oxides present in the primer 24 may also be the element tracer. Said differently, at least one of the metal oxides present in the primer 24 may be used as the pigment component and the element tracer. For example, the zinc oxide has a color that is generally white, which tends to lighten the primer color and the zinc oxide can be used as the element tracer so long as the zinc oxide is not present in the ceramic frit 20. The influence of the metal oxide used, in combination with other pigment components, such as additives, produces the primer color that is substantially similar to the frit color. The primer 24 may also comprise an amorphous carbon black formed from fumed acetylene. A suitable amorphous carbon black for the present invention is commercially available from Alfa-Asar. However, other carbon black pigments and/or dyes may be utilized without deviating from the subject invention.

Generally, both the frit color and the primer color are referred to as black. It is to be appreciated that while the term black is used herein, it is only meant to provide a reference and is not meant to imply absolute black. It is to be appreciated that the term black can include various color shades that resemble black when viewed by an observer. It is to be appreciated that the frit color and the primer color may be other colors besides black depending on aesthetic and/or functional requirements for the window assembly 10.

A Delta (Δ)-E value can be used to quantify the difference between the frit color and the primer color, based on the L*a*b* values of the primer 24 and the ceramic frit 20. Typically, the Delta-E value between the primer color and the frit color is less than about 5, more typically of from 5 to 0, and even more typically from 1 to 0. It is to be appreciated that any acceptable method of determining Delta-E may be used, including Delta-E 1976, Delta-E 1994, Delta-E CMC, and Delta-E 2000.

Figure 6:
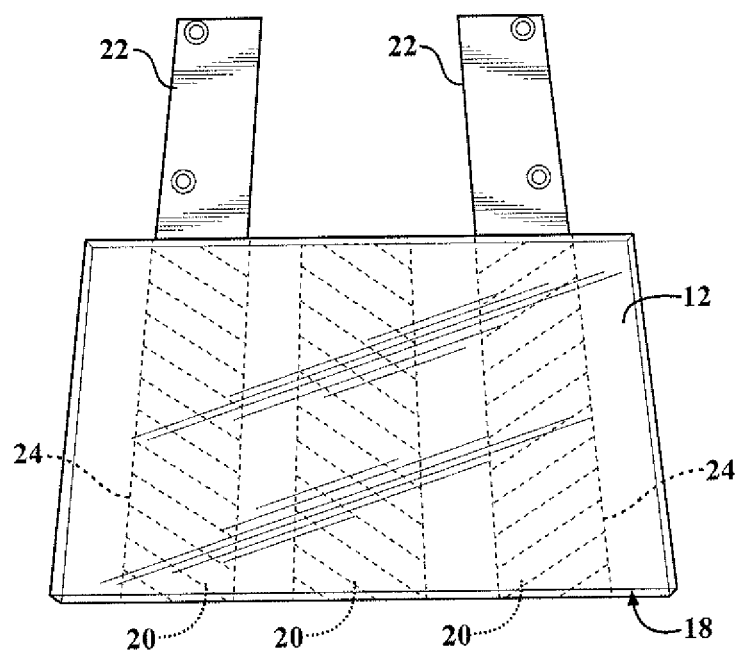
FIG. 6 is a perspective view of a prototype window assembly for comparing a primer color of a primer with a frit color of a ceramic frit.

With reference to FIGS. 6 and 7, prototype window assemblies are created to compare the primer color with the frit color. As described above, the primer color and the frit color are dependent on the pigment components present in the primer 24 and the ceramic frit 20. The pigment component of the primer 24 used in the prototype window assemblies comprises about 58 to about 63 parts by weight of fumed carbon black, about 20 to about 25 parts by weight chromium oxide, about 7 to about 12 parts by weight cobalt oxide, about 5 to about 10 parts by weight iron oxide, and about 1 to about 6 parts by weight zinc oxide based on 100 parts by weight of the pigment component of the primer 24.

The pigment component of the ceramic frit 20 used in the prototype window assemblies comprises about 38 to about 43 parts by weight bismuth oxide, about 37 to about 42 parts by weight silicon dioxide, about 5 to about 10 parts by weight chromium oxide, about 1 to about 6 parts by weight manganese oxide, about 1 to about 6 parts by weight copper oxide, about 1 to about 6 parts by weight zinc oxide, about 1 to about 6 parts by weight nickel oxide, and about 1 to about 6 parts by weight iron oxide based on 100 parts by weight of the pigment component of the ceramic frit 20. The frit color and the primer color were measured using the Konica Minolta spectrophotometer with an 8-degree viewing angle according to ASTM E 1164. The frit color measured had an "L" value of 20.00, an "a" value of −0.59, and a "b" value of −0.22. Additionally, the primer color measured had an "L" value of 19.10, an "a" value of −0.30, and a "b" value of −0.05. As such, the Delta-E value between the ceramic frit 20 and the primer 24 is 0.955, which is within the ranges for Delta-E provided above.

The transparent pane 12 is typically received at a production facility as the printed assembly, i.e., with the ceramic frit 20 already bonded thereto, as described above. As indicated above, it is to be appreciated that the transparent pane 12 may be either non-tempered or tempered glass, and may be non-laminated or laminated. During production, the primer 24 may be applied to the ceramic frit 20, the edge 18 and, if appropriate, to the portion of the transparent pane 12 exposed between the ceramic frit 20 and the edge 18 of the printed assembly. Depending on whether the window assembly 10 will include a single, double, or triple-sided encapsulation, additional primer 24 may be added to the transparent pane 12. Typically, the primer 24 is applied using a felt applicator brush, either manually or in an automated process via a robotic arm. It is to be appreciated that the primer 24 may also be applied using any other suitable method of application.

Typically, the primer 24 is applied to the inner surface 14 of the transparent pane 12 and around the edge 18 of the transparent pane 12, such that it appears that the primer 24 wraps around the edge 18 of the transparent pane 12. After the primer 24 has cured on the transparent pane 12, the transparent pane 12 is placed into a die cavity. The die cavity is closed for heating the transparent pane 12 and the primer 24 disposed thereon, to a predetermined temperature. The polymeric material is then injected into the die cavity for forming the encapsulation 22. During the formation of the encapsulation 22, the encapsulation 22 bonds to the transparent pane 12. More specifically, during the formation of the encapsulation 22, the encapsulation 22 bonds to the primer 24, that has been bonded either directly to the transparent pane 12 or to the ceramic frit 20, which is bonded to the transparent pane 12. The transparent pane 12 is removed from the die cavity.

As described above, the elemental tracer may be used to verify the presence of the primer 24 during subsequent operations. For example, in the event of a failure of the bond between the encapsulation 22 and the transparent pane 12, the encapsulation 22 or a sample portion of the encapsulation 22 may be analyzed using x-ray fluorescence spectroscopy, or any other suitable instrument, to detect the presence of the elemental tracer (e.g., cobalt oxide) for determining whether the primer 24 was actually applied during production of the window assembly 10. If the elemental tracer is not detected, the primer 24 was not applied. However, if the elemental tracer is detected, the primer 24 was applied during production of the window assembly 10, and other root-cause analysis will be conducted to determine the cause of the failure of the bond between the encapsulation 22 and the transparent pane 12.

As another example, the transparent pane 12 may be tested right after production to determine if the primer 24 was correctly applied. Again, the encapsulation 22 or a sample portion of the encapsulation 22 may be analyzed using x-ray fluorescence spectroscopy, or any other suitable instrument, to detect the presence of the elemental tracer (e.g., cobalt oxide) for ensuring the primer 24 was correctly applied during production of the window assembly 10. If the elemental tracer is not detected, then the primer 24 was not applied and production can be stopped to correct the failure to apply the primer 24. This is beneficial to prevent shipping of a defective window assembly that lacks the primer 24 thereby preventing the defective window assembly from being installed on vehicles. It is to be appreciated that every transparent pane 12 produced may not be tested and that only a random sampling of the transparent panes 12 produced may be tested. For example, ever fifth transparent pane 12 produced may be tested.

The invention has been described in an illustrative manner, and it is to be understood that the terminology, which has been used, is intended to be in the nature of words of description rather than of limitation. It is now apparent to those skilled in the art that many modifications and variations of the present invention are possible in light of the above teachings. It is, therefore, to be understood that the invention can be practiced otherwise than as specifically described.

What is claimed is:

1. A window assembly for a vehicle, said window assembly comprising:
    a transparent pane having an inner surface and an outer surface opposite said inner surface with said transparent pane having an edge between said inner and outer surfaces;
    a ceramic frit disposed on a portion of said transparent pane and spaced from said edge of said transparent pane with a portion of said inner surface of said transparent pane exposed between said ceramic frit and said edge, and with said ceramic frit having a frit color;
    a primer disposed on said portion of said transparent pane exposed between said edge and said ceramic frit and disposed on said ceramic frit for providing a bonding surface with said primer having a primer color; and
    an encapsulation comprising a thermoplastic material bonded to said bonding surface of said primer for coupling said transparent pane to the vehicle with said encapsulation covering at least a portion of said ceramic frit and at least a portion of said primer disposed on said portion of said transparent pane exposed between said edge and said ceramic frit such that said encapsulation extends beyond said ceramic frit to at least said edge of said transparent pane;
    wherein a Delta-E value between said frit color of said ceramic frit and said primer color of said primer is less than about 5.

2. A window assembly as set forth in claim 1 wherein said Delta-E value between said frit color of said ceramic frit and said primer color of said primer is from 5 to 0.

3. A window assembly as set forth in claim 1 wherein said primer comprises at least one pigment component selected from the group of fumed carbon black, chromium oxide, cobalt oxide, iron oxide, zinc oxide, and combinations thereof for imparting said primer with said primer color.

4. A window assembly as set forth in claim 3 wherein said ceramic frit comprises at least one pigment component selected from the group of bismuth oxide, silicon dioxide, chromium oxide, manganese oxide, copper oxide, zinc oxide, nickel oxide, iron oxide, and combinations thereof for imparting said ceramic frit with said frit color.

5. A window assembly as set forth in claim 4 wherein said pigment component of said ceramic frit comprises about 38 to about 43 parts by weight bismuth oxide, about 37 to about 42 parts by weight silicon dioxide, about 5 to about 10 parts by weight chromium oxide, about 1 to about 6 parts by weight manganese oxide, about 1 to about 6 parts by weight copper oxide, about 1 to about 6 parts by weight zinc oxide, about 1 to about 6 parts by weight nickel oxide, and about 1 to about 6 parts by weight iron oxide based on 100 parts by weight of said pigment component of said ceramic frit.

6. A window assembly as set forth in claim 5 wherein said pigment component of said primer comprising about 58 to about 63 parts by weight of fumed carbon black, about 20 to about 25 parts by weight chromium oxide, about 7 to about 12 parts by weight cobalt oxide, about 5 to about 10 parts by weight iron oxide, and about 1 to about 6 parts by weight zinc oxide based on 100 parts by weight of said pigment component of said primer.

7. A window assembly as set forth in claim 4 wherein said primer comprises an element tracer for verifying a presence of said primer on said transparent pane.

8. A window assembly as set forth in claim 7 wherein said element tracer of said primer is a metal oxide that is different than any metal oxide comprised by said ceramic frit for allowing identification of a presence of said element tracer of said primer to verify the presence of said primer on said transparent pane.

9. A window assembly as set forth in claim 8 wherein said thermoplastic material of said encapsulation comprises polyvinylchloride and said primer comprises a polyester.

10. A window assembly as set forth in claim 8 wherein said thermoplastic material of said encapsulation comprises a thermoplastic elastomer material and said primer comprises polypropylene.

11. A method of manufacturing a window assembly for a vehicle with said window assembly having a transparent pane, said method comprising the steps of:
  applying a ceramic frit spaced from an edge of the transparent pane with a portion of the transparent pane exposed between the ceramic frit and the edge, and with the ceramic frit having a frit color on a portion of the transparent pane;
  applying a primer between the edge of the transparent pane and the ceramic frit with the primer having a primer color on the transparent pane and the ceramic frit to provide a bonding surface on the transparent pane wherein a Delta-E value between the frit color of the ceramic frit and the primer color of the primer is less than about 5; and
  applying an encapsulation comprising a thermoplastic material to the bonding surface of the primer to allow the window assembly to be coupled to the vehicle with the encapsulation covering at least a portion of the ceramic frit and at least a portion of the primer disposed on the portion of the transparent pane exposed between the edge and the ceramic frit such that the encapsulation extends beyond the ceramic frit to at least the edge of the transparent pane.

12. A method as set forth in claim 11 wherein the Delta-E value between the frit color of the ceramic frit and the primer color of the primer is from 5 to 0.

13. A method as set forth in claim 11 further comprising the step of adding at least one pigment component selected from the group of fumed carbon black, chromium oxide, cobalt oxide, iron oxide, zinc oxide, and combinations thereof to the primer to impart the primer with the primer color.

14. A method as set forth in claim 13 wherein the step of adding at least one pigment component to the primer is further defined as adding pigment components to the primer in an amount of about 58 to about 63 parts by weight of fumed carbon black, about 20 to about 25 parts by weight chromium oxide, about 7 to about 12 parts by weight cobalt oxide, about 5 to about 10 parts by weight iron oxide, and about 1 to about 6 parts by weight zinc oxide based on 100 parts by weight of the pigment components of the primer.

15. A method as set forth in claim 14 further comprising the step of adding at least one pigment component selected form the group of bismuth oxide, silicon dioxide, chromium oxide, manganese oxide, copper oxide, zinc oxide, nickel oxide, iron oxide, and combinations thereof to the ceramic frit to impart the ceramic frit with the frit color.

16. A method as set forth in claim 15 wherein the step of adding at least one pigment component to the ceramic frit is further defined as adding pigment components to the ceramic frit in an amount of about 38 to about 43 parts by weight bismuth oxide, about 37 to about 42 parts by weight silicon dioxide, about 5 to about 10 parts by weight chromium oxide, about 1 to about 6 parts by weight manganese oxide, about 1 to about 6 parts by weight copper oxide, about 1 to about 6 parts by weight zinc oxide, about 1 to about 6 parts by weight nickel oxide, and about 1 to about 6 parts by weight iron oxide based on 100 parts by weight of the pigment components of the ceramic frit.

17. A method as set forth in claim 11 further comprising the step of adding an element tracer to the primer which is a metal oxide that is different than any metal oxide present in the ceramic frit to allow a presence of the primer on the transparent pane to be verified.

18. A method as set forth in claim 11 wherein the thermoplastic material of the encapsulation comprises polyvinylchloride and the primer comprises a polyester.

19. A method as set forth in claim 11 wherein the thermoplastic material of the encapsulation comprises a thermoplastic elastomer material and the primer comprises polypropylene.

20. A window assembly for a vehicle, said window assembly comprising:
  a transparent pane having an inner surface and an outer surface opposite said inner surface with said transparent pane having an edge between said inner and outer surface;
  a ceramic frit disposed on a portion of said transparent pane and spaced from said edge of said transparent pane with a portion of said inner surface of said transparent pane exposed between said ceramic frit and said edge, and with said ceramic frit comprising at least one metal oxide;
  a primer disposed on said portion of said transparent pane exposed between said edge and said ceramic frit and disposed on said ceramic frit for providing a bonding surface with said primer comprising an element tracer; and
  an encapsulation bonded to said bonding surface of said primer for coupling said window assembly to the vehicle with said encapsulation covering at least a portion of said ceramic frit and at least a portion of said primer disposed on said portion of said transparent pane exposed between said edge and said ceramic frit such that said encapsulation extends beyond said ceramic frit to at least said edge of said transparent pane;

wherein said element tracer comprises at least one metal oxide that is different than said metal oxide of said ceramic frit for verifying a presence of said primer on said transparent pane.

21. A window assembly as set forth in claim 20 wherein said metal oxide of said ceramic frit is selected from the group of chromium oxide, manganese oxide, copper oxide, iron oxide, and combinations thereof.

22. A window assembly as set forth in claim 21 wherein said element tracer comprises at least one metal oxide selected from the group of iron oxide, cobalt oxide, manganese oxide, zinc oxide, and combinations thereof so long as said metal oxide of said element tracer of said primer is different than said metal oxide of said ceramic frit.

23. A window assembly as set forth in claim 22 wherein said element tracer is cobalt oxide.

24. A window assembly as set forth in claim 22 wherein said element tracer is a combination of cobalt oxide and zinc oxide.

25. A window assembly as set forth in claim 22 wherein said primer comprises at least one pigment component for imparting said primer with a primer color wherein said pigment component of said primer is selected from the group of fumed carbon black, chromium oxide, cobalt oxide, iron oxide, zinc oxide, and combinations thereof.

26. A window assembly as set forth in claim 25 wherein said ceramic frit comprises at least one pigment component for imparting said ceramic frit with a frit color wherein said pigment component of said ceramic frit is selected from the group of bismuth oxide, silicon dioxide, chromium oxide, manganese oxide, copper oxide, zinc oxide, nickel oxide, iron oxide, and combinations thereof and a Delta-E value between said primer color and said frit color is less than about 5.

27. A window assembly as set forth in claim 1 wherein said primer is disposed on said edge of said transparent pane.

28. A window assembly for a vehicle, said window assembly comprising:

a transparent pane having an inner surface and an outer surface opposite said inner surface;

a ceramic frit disposed on a portion of said transparent pane with said ceramic frit having a frit color;

a primer disposed on said transparent pane and said ceramic frit for providing a bonding surface with said primer having a primer color; and an encapsulation comprising a thermoplastic material bonded to said bonding surface of said primer for coupling said transparent pane to the vehicle;

wherein a Delta-E value between said frit color of said ceramic frit and said primer color of said primer is less than about 5;

wherein said primer comprises at least one pigment component selected from the group of fumed carbon black, chromium oxide, cobalt oxide, iron oxide, zinc oxide, and combinations thereof for imparting said primer with said primer color; and wherein said pigment component of said ceramic frit comprises about 38 to about 43 parts by weight bismuth oxide, about 37 to about 42 parts by weight silicon dioxide, about 5 to about 10 parts by weight chromium oxide, about 1 to about 6 parts by weight manganese oxide, about 1 to about 6 parts by weight copper oxide, about 1 to about 6 parts by weight zinc oxide, about 1 to about 6 parts by weight nickel oxide, and about 1 to about 6 parts by weight iron oxide based on 100 parts by weight of said pigment component of said ceramic frit for imparting said ceramic frit with said frit color.

\* \* \* \* \*